(No Model.)

H. L. WOOD.
NUT LOCK.

No. 530,740. Patented Dec. 11, 1894.

Witnesses:—
James R. Steen
Anthony J. Ernest

Inventor.
Horace L. Wood.

UNITED STATES PATENT OFFICE.

HORACE L. WOOD, OF NEW YORK, N. Y.

NUT-LOCK.

SPECIFICATION forming part of Letters Patent No. 530,740, dated December 11, 1894.

Application filed March 7, 1894. Serial No. 502,768. (No model.)

*To all whom it may concern:*

Be it known that I, HORACE L. WOOD, a citizen of the United States, residing at the city, county, and State of New York, have invented a certain new and useful Improvement in Nut-Locks, of which the following is a specification.

My invention relates to improvements in nut locks, and has for its object, safety and security of nuts whereby the same are prevented from turning or becoming loose, and consists in the construction and novel combination which is hereby illustrated by the accompanying drawings.

Figure 1:
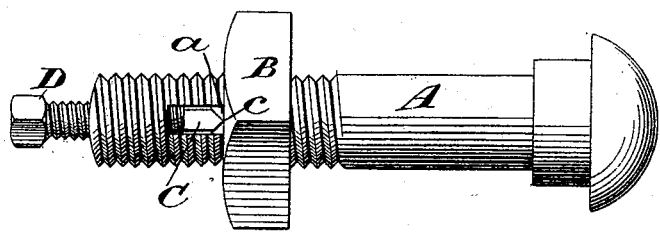
Figure 3:
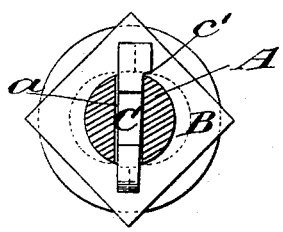
Figure 2:
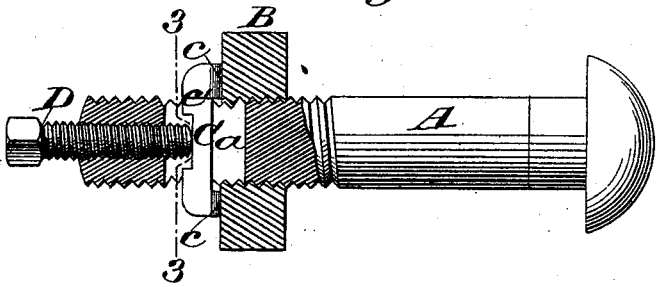

Figure 1 represents a longitudinal view of a bolt and nut having a nut lock constructed according to my invention. Fig. 2 represents a longitudinal view taken at right angles to the view shown in Fig. 1, part of the bolt and the nut being in section and the nut lock being shown entire. Fig. 3 represents a transverse section taken in the line 3, 3, of Fig. 2.

For a further detailed description, A designates a plain threaded bolt having a transverse slot through its threaded portion to receive the clamp or dog C, which is inserted thereinto outside of the nut B, on the bolt, thus allowing the clamp or dog C, to pass sufficiently through so as to engage the outer face of the nut on both sides of the bolt, the same having a longitudinal threaded bore connecting with the slot, and also having a threaded set screw D, screwed into the bore and against the clamp or dog C.

B designates a nut on bolt A in Figs. 1, 2 and 3, in locking position.

C designates the clamp or dog, the different views thereof being shown in Figs. 1, 2 and 3. The view in Fig. 1, shows the clamp or dog in the slot of the bolt in a locking position, and the recess in the outer-face of the clamp or dog is indicated by letter $a$, and is clearly shown in Figs. 1 and 2, and $c$, in Fig. 1, indicates one of the sharp projecting edges of the clamp or dog, which is clearly defined in Fig. 2, the clamp or dog having sharp projecting edges $c, c$, as shown in Fig. 2, in a locking position, the same being constructed so that when it is in position in the slot of the bolt the sharp projecting edges thereof will be at the outer sides of the bolt as shown at $c, c,$ in Fig. 2, this clamp or dog having also a shoulder $c'$ on the upper side of the same for the purpose of preventing the clamp or dog from falling through the slot of the bolt as shown in Figs. 2 and 3.

D, designates the set screw in Fig. 1, screwed into the longitudinal threaded bore of the bolt and against the clamp or dog C, in the recess $a$, whereby the same holds the clamp or dog firmly against the nut, thus preventing the nut from turning or becoming loose. D, also represents another view of the set screw in Fig. 2, part of the bolt and nut being in section showing where the set screw engages the clamp or dog in the recess $a$, thereof, the same being in locking position.

To unlock the nut or remove the same from the bolt, turn the set screw D, back three or four turns. Then the clamp or dog C, becomes disengaged and can be removed easily, and the nut can be removed from the bolt without further disturbing the set screw.

What I claim as my invention, and desire to secure by Letters Patent, is—

1. The combination with a screw-bolt having a transverse slot and having in its end a screw-threaded longitudinal bore communicating with said slot, of a nut screwing onto said bolt, a clamp or dog inserted into said slot outside of the nut and a set screw screwing into said bore to press the clamp or dog against the nut, substantially as herein set forth.

2. The combination with a screw-bolt having a transverse slot through its threaded portion and having in its end a screw-threaded longitudinal bore communicating with said slot, of a nut screwing on to said bolt, a clamp or dog inserted through said slot and projecting therefrom on opposite sides of the bolt and a set-screw screwing into said bore, the so projecting portions of said clamp or dog having sharp edges to be indented into the nut by the pressure of the set screw, substantially as herein set forth.

HORACE L. WOOD.

Witnesses:
JAMES R. STEERS, Jr.,
ANTHONY J. ERNEST.